US006200537B1

(12) United States Patent
Watanabe et al.

(10) Patent No.: US 6,200,537 B1
(45) **Date of Patent: *Mar. 13, 2001**

(54) FUEL-REFORMING SHEET AND METHOD OF MANUFACTURE THEREOF

(76) Inventors: Takashi Watanabe, 2-21-5 Seihou, Kurume-shi, Fukuoka-ken 839-0853 (JP); Hideaki Nogami, c/o Cera Japan Co., Ltd., 4-27-5 Hakata- Ekimae Hakata-ku, Fukuoka-ken 812-0011 (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,390

(22) Filed: May 5, 1998

(30) Foreign Application Priority Data

Jul. 10, 1997 (JP) .................................................. 9-199172

(51) Int. Cl.$^{7}$ .............................. B01D 53/34; F01N 3/00

(52) U.S. Cl. .......................... 422/177; 422/168; 422/211; 502/527.24

(58) Field of Search .................................... 422/177–181, 422/211, 222; 502/527.18, 527.19, 527.23, 527.24

(56) References Cited

U.S. PATENT DOCUMENTS 3,891,575 * 6/1975 Bräutigam et al. .................. 502/247
4,717,609 * 1/1988 Gaku et al. ......................... 428/40.1
4,859,439 * 8/1989 Rikimaru et al. ................. 423/239.1
5,294,462 * 3/1994 Kaiser et al. ........................ 427/446
5,312,868 * 5/1994 Abe et al. ............................ 525/124
5,350,793 * 9/1994 Kishimoto et al. .................. 524/449

FOREIGN PATENT DOCUMENTS 63-33487 * 2/1988 (JP) ................................. C09J/7/02

* cited by examiner

*Primary Examiner*—Shrive Beck
*Assistant Examiner*—Alexa A. Doroshenk
(74) *Attorney, Agent, or Firm*—Hedman & Costigan, P.C.

(57) ABSTRACT

A fuel-reforming sheet which is adapted to be placed in the air flow channel of a heat engine to ionize the oxygen molecules in order to achieve complete combustion of the oxygen mixed with a fuel is constructed from a flexible backing, a double-sided adhesive sheet having front and back adhesive surfaces, and a powdered mixture which includes a ceramic powder, a radioactive rare-earth mineral powder and a binder, in which the rear adhesive surface of the double-sided adhesive sheet is bonded to the flexible backing and the powdered mixture is bonded to the front adhesive surface of the double-sided adhesive sheet.

1 Claim, 2 Drawing Sheets

FUEL-REFORMING SHEET AND METHOD OF MANUFACTURE THEREOF

BACKGROUND OF THE INVENTION

1. Field of the Invention

The present invention relates to a fuel-reforming sheet and method of manufacture thereof for improving the fuel efficiencies of various types of heat engines, such as those used in work trucks, buses, passenger cars, marine vessels and boilers, which use liquid fuels such as gasoline, light fuel oil, heavy fuel oil and methanol, and gas fuels such as LPG and natural gas, while at the same time making it possible to drastically reduce emissions such as CO, HC and black smoke (produced by Diesel engines) in the exhaust gas of such heat engines.

2. Description of the Prior Art

In the field of fuel-reforming devices, the present inventor previously invented a fuel-reforming device (disclosed in Japanese Utility Model Application No. HEI 8-10566) in which a ceramic powder and a radioactive rare-earth mineral powder were mixed, granulated, dried, baked, grounded to form spherically shaped grains having roughly the same diameter, and filled into a cylindrical body which has pores smaller than the diameter of such spherically shaped grains formed in the circumferential surface and in the surface of cover portions of the cylindrical body. In this connection, the cylindrical body was given a porosity of 50% and was filled with the spherically shaped grains to have a fill ratio of 90%. Further, one cover portion of the cylindrical body was provided with a rotary-type chain such as a ball chain, and the other cover portion was provided with a fitting member such as a ring-type coupling.

However, the requirement of a baking step or the like when processing the ceramic powder and radioactive rare-earth mineral powder makes it time-consuming and expensive to manufacture such a fuel-reforming device. Furthermore, there is the inconvenience of having to place such a fuel-reforming device inside the fuel tank.

SUMMARY OF THE INVENTION

With a view toward overcoming the problems of the prior art stated above, it is an object of the present invention to provide a fuel-reforming sheet which is adapted to be placed in the air flow channel of a heat engine to ionize the oxygen molecules in the air in order to achieve complete combustion of the oxygen mixed with the fuel and thereby improve the power and fuel efficiency of the heat engine, while at the same time reducing unwanted emissions in the exhaust gas. It is a further object of the present invention to provide a fuel-reforming sheet made from a sheet-shaped backing having powder grains firmly bonded thereto. It is another object of the present invention to provide a method of manufacturing the fuel-reforming sheet according to the present invention.

In order to achieve these objects, the fuel-reforming sheet according to the present invention is constructed from a flexible backing, a double-sided adhesive sheet having a back surface which is bonded to the flexible backing, and a powdered mixture which is bonded to a front surface of the double-sided adhesive sheet, with the powdered mixture including a ceramic powder, a radioactive rare-earth mineral powder and a binder.

Further, in the fuel-reforming sheet according to the present invention, the ceramic powder and the radioactive rare-earth mineral powder have a grain size in the range of 250–350 mesh.

As for the flexible backing of the fuel-reforming sheet according to the present invention, it is possible to use a thin stainless steel sheet or a heat-resistant, cold-resistant and weather-resistant thermoplastic resin sheet.

Further, in the fuel-reforming sheet according to the present invention, the powdered mixture may also include sericite as a filler and magnetite may be used as the binder.

In the method of manufacturing a fuel-reforming sheet according to the present invention, a back adhesive surface of an ultrathin double-sided adhesive tape is first bonded to a flexible backing, and then after removing a release paper from a front adhesive surface of the double-sided adhesive tape, a powdered mixture comprising a ceramic powder, a radioactive rare-earth mineral powder and a binder is air sprayed onto the front adhesive surface of the double-sided adhesive tape to bond the powdered mixture to the double-sided adhesive tape.

DETAILED DESCRIPTION OF THE PREFERRED EMBODIMENTS

A detailed description of an embodiment of the present invention will now be given with reference to the appended drawings.

Figure 2:
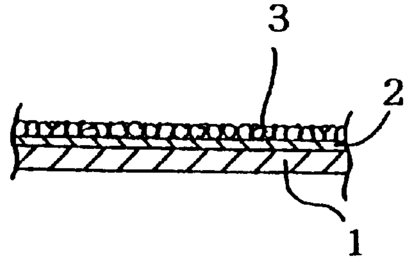
FIG. 2 is an enlarged cross-sectional view of the embodiment of the present invention.
Figure 3:
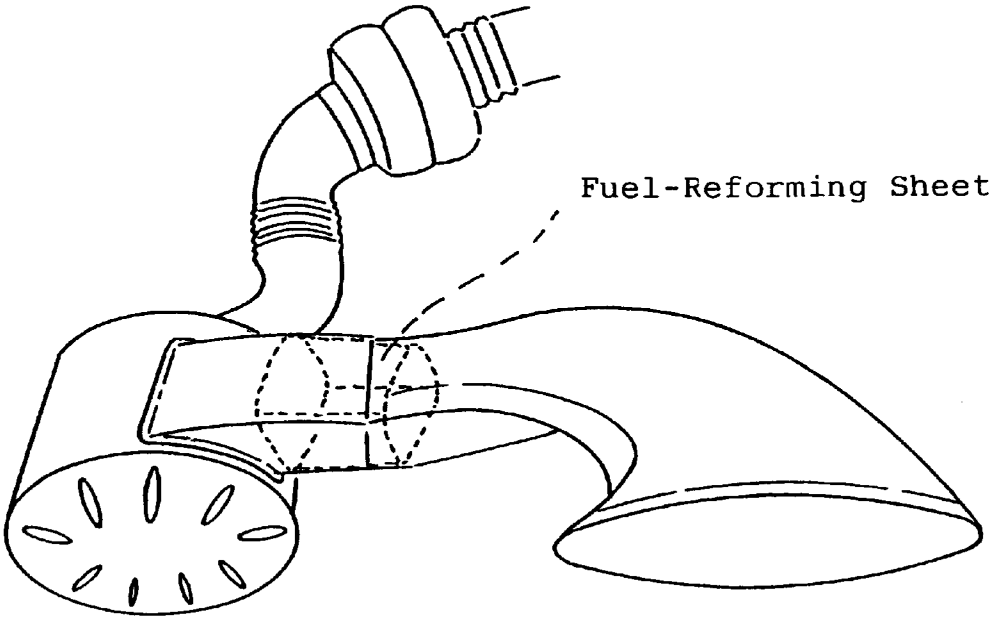
FIG. 3 is a rough explanatory drawing showing the fuel-reforming sheet of the present invention in an installed state.

As shown in FIG. 2, the base of a fuel-reforming sheet is a flexible backing 1 made from a thin stainless steel sheet or a heat-resistant, cold-resistant, weather-resistant thermoplastic resin sheet. For example, when SUS304 material is used, a sheet of such material having a thickness of 0.2 mm is cut to a length of 26 cm and width of 18 cm. However, the present invention is not limited to these dimensions (including the thickness), and it is possible to change the dimensions of the sheet in accordance with the intended use and location. In the case of a thermoplastic sheet, it is possible to use a heat-resistant, cold-resistant and weather-resistant resin such as a polyamide resin, silicon resin, or a fluororesin polyethylene such as polytetrafluoroethylene or the like. In any case, the backing must have sufficient flexibility to be deformable in order for the fuel-reforming sheet to be placed in an air flow path of an engine. For example, in the case where the fuel-reforming sheet is to be placed near a filter installation port inside an air flow channel in between an air filter and an air intake port of an automobile engine, the backing 1 must be deformable to match the shape of such air flow channel.

As is further shown in FIG. 2, a double-sided adhesive sheet 2 is bonded to the top of the flexible backing 1. The double-sided adhesive sheet 2 is made by applying an adhesive to both sides of an ultrathin film, with the adhesive being a type that enables strong bonding between the backing 1 and a powdered body 3 containing a ceramic powder, a radioactive rare-earth mineral powder and a powdered binder described below. Examples of various types of suitable adhesives include vinyl acetal phenol adhesives, nitrile rubber phenol adhesives, nylon epoxy adhesives, nitrile rubber epoxy adhesives, and epoxy phenol adhesives. Thus, the double-sided adhesive sheet 2 is formed by applying one of the adhesives described above to both sides of an ultrathin film, with release paper (not shown in the drawings) being stuck to the adhesive surfaces of both sides of the adhesive sheet prior to use.

Figure 1:
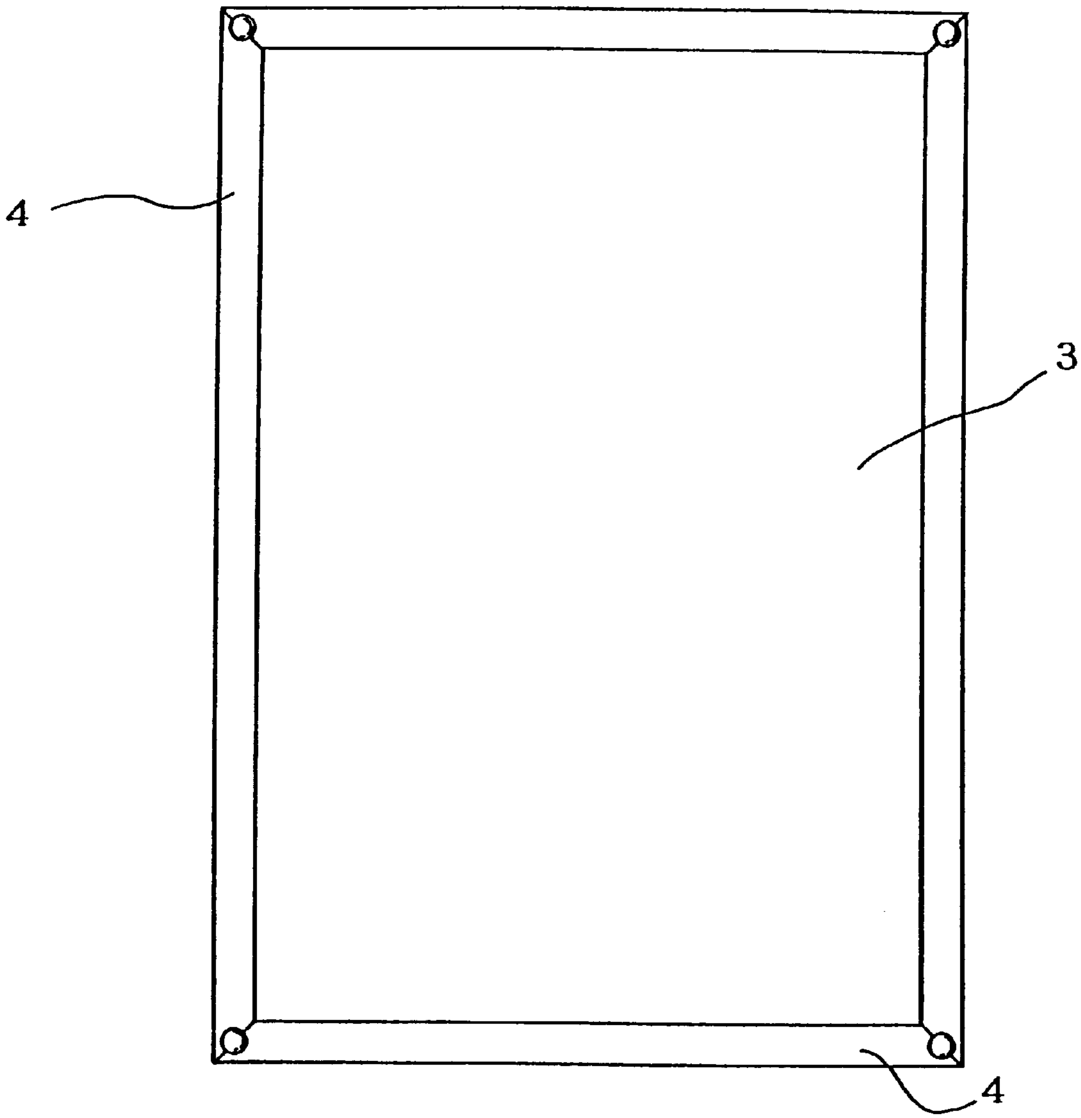
FIG. 1 is a plan view of an embodiment of the present invention.

Now, as shown in FIGS. 1 and 2, a powdered mixture 3 containing a ceramic powder, a radioactive rare-earth mineral powder and a binder is sprayed by air onto the top surface of the double-sided adhesive sheet 2 to uniformly disperse and bond the powdered mixture 3 to the adhesive surface thereof. Normally, in order to spray and bond the powdered mixture 3 to the backing 1, the surface of the backing 1 is roughened by sandblasting or the like to enable the adhesive to be easily bonded to the backing 1, as well as making it possible to apply the adhesive directly to the surface of the backing 1. However, in the case where the adhesive is directly applied to the surface of the backing 1, it is difficult to neatly and uniformly disperse and bond the powdered mixture 3 to the adhesive surface, and such arrangement can also lead to localized uneven application. In this connection, the present invention avoids such problems by the use of the double-sided adhesive sheet 2 which eliminates the need for a surface treatment, and in this way it becomes possible to speed up operations, improve efficiency, and achieve a uniform dispersion of the applied adhesive surface.

Preferably, the powdered mixture 3 should have a grain size within the range of 250–350 mesh,with a grain size of 300 mesh being the most prefered. If the grain size is above 350 mesh, there will be insufficient bonding of the powder grains to the top adhesive surface of the double-sided adhesive sheet 2 which is bonded to the top of the backing 1, and because this increases the ability of the powder grains to separate from the adhesive surface of the double-sided adhesive sheet 2, the grain size of the powdered mixture 3 is preferable below 350 mesh. On the other hand, if the grain size is below 250 mesh, the powdered mixture 3 will form a film on the top adhesive surface of the double-side adhesive sheet 2, and because this results in the falling off of powder grains even after bonding, the grain size of the powdered mixture 3 is preferably above 250 mesh.

Further, the ceramic powder, radioactive rare-earth mineral powder and binder need to be uniformly dispersed in order to give the powdered mixture 3 a uniform density when the powdered mixture 3 is bonded to the top adhesive surface of the double-sided adhesive sheet 2.

The ceramic powder is a base made of alumina and silica, and the radioactive rare-earth mineral powder is obtained by pulverizing a rare-earth mineral which contains a radioactive compound such as thorium oxide or the like. The ceramic powder and the radioactive rare-earth mineral powder are mixed at a relative weight ratio of 50% to 50% together with a binder such as magnetite powder and a filler made of a far-infrared radioactive substance such as sericite. In one preferred example weight ratio, the powdered mixture 3 contains 50% ceramic powder and radioactive rare-earth mineral powder, 30% sericite, and 20% binder.

Now,when the fuel-reforming sheet is arranged in the air flow channel, radiation such as a-rays and b-rays emitted by the radioactive rare-earth mineral powder creates approximately 3,000 negative oxygen ions per cubic centimeter of the air in the air flow channel, and because this activates the air required for combustion, it becomes possible to achieve a complete combustion of the air mixed with the fuel, whereby the power and fuel efficiency are improved and unwanted emissions in the exhaust gas are reduced.

As is further shown in FIG. 1, a protecting tape 4 is bonded to the peripheral portions of both sides of the backing 1 to protect a user from being injured by the corner portions of the backing 1 when handling the fuel-reforming sheet.

Now, when carrying out installation of the fuel-reforming sheet of the present invention, if the fuel-reforming sheet is longer than the air flow duct, the fuel-reforming sheet is first cut with scissors or the like to match the length of the air flow duct, and then the fuel-reforming sheet is placed inside the air flow duct with the powdered grain surface facing the inside of the air flow channel. In this connection, because the fuel-reforming sheet of the present invention is flexible, it is possible to install the fuel-reforming sheet in the air flow duct without the use of a fastener simply by bending the fuel-reforming sheet to match the shape of the air flow channel.

SPECIFIC EMBODIMENT 1

A fuel-reforming sheet constructed as described above was placed inside the air flow channel of an automobile in between the air intake port and the air filter at a position near the air filter. A Matsuda Model E-HBEY custom cab was used for the automobile, L.P.G. was used as a fuel, and the driving range was between the Japanese cities of Fukuoka and Nagasaki. Tables 1 and 2 show results such as the driving distance per liter of fuel and the fuel efficiency for both before and after installation of the fuel-reforming sheet.

TABLE 1

TABLE 2

SPECIFIC EMBODIMENT 2

A fuel-reforming sheet constructed as described above was placed inside the air flow channel of an automobile in between the air intake port and the air filter at a position near the air filter. A Nissan Bluebird Model E-PC910 was used for the automobile, L.P.G. was used as a fuel (which is the fuel used by private taxis in Japan), and the driving range was inside the Japanese city of Kitakyushu (with the air conditioner in use). Tables 3 and 4 show results such as the driving distance per liter of fuel and the fuel efficiency for both before and after installation of the fuel-reforming sheet.

TABLE 3

TABLE 4

SPECIFIC EMBODIMENT 3

A fuel-reforming sheet constructed as described above was placed inside the air flow channel of an automobile in between the air intake port and the air filter at a position near the air filter. A Toyota Corolla Model E-AE91 was used for the automobile, gasoline was used as a fuel, and the driving range was between the Kurume Interchange and the Kumamoto Interchange in Japan (with the air conditioner in use). Tables 5 and 6 show results such as the driving distance per liter of fuel and the fuel efficiency for both before and after installation of the fuel-reforming sheet.

TABLE 5

TABLE 6

SPECIFIC EMBODIMENT 4

A fuel-reforming sheet constructed as described above was placed inside the air flow channel of an automobile in between the air intake port and the air filter at a position near the air filter. A Toyota Corolla Model E-AE91 was used for the automobile, gasoline was used as a fuel, and the driving range was between the Kurume Interchange and the Kumamoto Interchange in Japan (with the air conditioner in use). Tables 7 and 8 show results such as the driving distance per liter of fuel and the fuel efficiency for both before and after installation of the fuel-reforming sheet.

TABLE 7

TABLE 8

SPECIFIC EMBODIMENT 5

A fuel-reforming sheet constructed as described above was placed inside the air flow channel of an automobile in between the air intake port and the air filter at a position near the air filter. A Nissan Sunny Model E-B12 was used for the automobile, gasoline was used as a fuel, and the driving range was inside the Japanese city of Fukuoka (with the air conditioner in use). Tables 9 and 10 show results such as the driving distance per liter of fuel and the fuel efficiency for both before and after installation of the fuel-reforming sheet.

TABLE 9

TABLE 10

SPECIFIC EMBODIMENT 6

A fuel-reforming sheet constructed as described above was placed inside the air flow channel of an automobile in between the air intake port and the air filter at a position near the air filter. A three-passenger Matsuda van having a displacement of 1490 cc was driven 48.2 km on an ordinary road (between Koga Interchange and Dazaifu Interchange in Japan), and gasoline was used as a fuel. Tables 11 and 12 show results such as the driving distance per liter of fuel and the fuel efficiency for both before and after installation of the fuel-reforming sheet.

TABLE 11

EFFECT OF THE INVENTION

As described above, the present invention provides a fuel-reforming sheet which is adapted to be placed in the air flow channel of an automobile engine a heat engine to ionize the oxygen molecules in the air in order to achieve complete combustion of the oxygen mixed with the fuel, whereby the fuel-reforming sheet of the present invention makes it possible to improve the power and fuel efficiency of the heat engine, while at the same time reducing unwanted emissions in the exhaust gas.

Further, by using a double-sided adhesive sheet having one side bonded to a sheet-shaped backing and another side which has powdered grains uniformly dispersed thereon, the present invention makes it possible to firmly bond the powdered grains uniformly to the sheet-shaped backing. Also, by using a flexible backing, the present invention provides a fuel-reforming sheet which is simple to install in the air flow channel of an air flow duct without the need for the type of fasteners used in prior art devices. Thus, the present invention provides a fuel-reforming sheet which is easy to use and manufacture.

Moreover, because the fuel-reforming sheet according to the present invention uses powdered grains only within a prescribed size range, it is possible firmly bond the powdered grains to the backing, and this makes it possible to use the fuel-reforming sheet of the present invention over a long period of time without the risk of the powdered grains fall off the backing.

Finally, it is to be understood that the present invention is not limited to the embodiments described above, and it is possible to make various changes and additions without departing from the scope and spirit of the invention as defined by the appended claims.

TABLE 1

| Before Installation | | | | | | | | |
|---|---|---|---|---|---|---|---|---|
| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
| 10/11 | 62,150 | 62,178 | 28 km | | | | | |
| 10/12 | 62,209 | 62,241 | 64 km | | | | | |
| 10/13 | 62,273 | 62,305 | 32 km | 155 km | 32 l | | | |
| Total | | | 155 km | | 32 l | 4.84 km/l | | |

TABLE 2

| After Installation | | | | | | | | |
|---|---|---|---|---|---|---|---|---|
| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
| 10/14~17 | 63,126 | 63,224 | 98 km | | | | | |
| 10/18~20 | 63,226 | 63,348 | 124 km | 222 km | 43.7 l | 5.08 km/l | 0.24 km/l | 4.95% |
| 10/21~22 | 63,348 | 63,583 | 235 km | | | | | |
| 10/23~24 | 63,583 | 63,769 | 186 km | 421 km | 55.0 l | 7.65 km/l | 2.81 km/l | 58.05% |
| 10/25~26 | 63,769 | 64,055 | 286 km | 286 km | 42.7 l | 6.69 km/l | 1.85 km/l | 38.22% |
| Total | | | 929 km | | 141.4 l | 6.57 km/l | 1.73 km/l | 35.74% |

TABLE 3

Before Installation

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| 8/21~22 | 96,718 | 96,912 | 194 km | 194 km | 56.9 l | 3.40 km/l | | |
| 8/23~24 | 96,912 | 97,088 | 176 km | 176 km | 52.1 l | 3.37 km/l | | |
| 8/25~26 | 97,088 | 97,294 | 206 km | 206 km | 58.5 l | 4.38 km/l | | |
| 8/27~28 | 97,294 | 97,492 | 198 km | 198 km | 57.4 l | 3.44 km/l | | |
| Total | | | 774 km | | 224.9 l | 3.44 km/l | | |

TABLE 4

After Installation

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| 8/29~30 | 97,492 | 97,686 | 194 km | 194 km | 46.3 l | 4.19 km/l | 0.75 km/l | 21.8% |
| 8/31~9/1 | 97,686 | 97,900 | 214 km | 214 km | 48.3 l | 4.43 km/l | 0.99 km/l | 20.45% |
| 9/2~3 | 97,900 | 98,157 | 257 km | 257 km | 53.2 l | 4.83 km/l | 1.39 km/l | 40.40% |
| 9/4~5 | 98,157 | 98,380 | 223 km | 223 km | 48.2 l | 4.62 km/l | 1.18 km/l | 34.30% |
| Total | | | 888 km | | 196.0 l | 4.53 km/l | 1.09 km/l | 31.68% |

TABLE 5

Before Installation

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| 10/4~6 | 46,203 | 46,244 | 41 km | | | | | |
| 10/7~10 | 46,244 | 46,316 | 72 km | | | | | |
| 10/11~12 | 46,316 | 46,369 | 53 km | | | | | |
| 10/13~15 | 46,369 | 46,429 | 60 km | 226 km | 22.8 l | | | |
| Total | | | 226 km | | 22.8 l | 9.87 km/l | | |

TABLE 6

After Installation

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| 10/16~20 | 46,492 | 46,536 | 107 km | | | | | |
| 10/21~24 | 46,536 | 46,661 | 125 km | 232 km | 16.8 l | 13.8 km/l | 3.93 km/l | 39.81% |
| 10/25~28 | 46,661 | 46,725 | 64 km | | | | | |
| 10/29~31 | 46,725 | 46,791 | 66 km | | | | | |
| 11/1~3 | 46,791 | 46,892 | 101 km | 231 km | 20.0 l | 11.5 km/l | 1.63 km/l | 16.51% |
| Total | | | | 463 km | 36.8 l | 12.58 km/l | 2.71 km/l | 27.456% |

TABLE 7

Before Installation

| Hour/ min. | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| 13:08 | 47,316 | 47,347 | 31 km | | | | | |
| 13:28 | 47,347 | 47,384 | 37 km | | | | | |

TABLE 7-continued

| Hour/ min. | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| | | | | Before Installation | | | | |
| 13:54 | 47,384 | 47,421 | 37 km | | | | | |
| 14:24 | 47,421 | 47,451 | 30 km | 135 km | | | | |
| Total | | | 135 km | | 8.63 l | 15.64 km/l | | |

TABLE 8

| Hour/ min. | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| | | | | After Installation | | | | |
| 13:08 | 47,452 | 47,483 | 31 km | | | | | |
| 13:28 | 47,483 | 47,520 | 37 km | | | | | |
| 13:54 | 47,520 | 47,557 | 37 km | | | | | |
| 14:24 | 47,557 | 47,587 | 30 km | 135 km | 6.62 l | | | |
| Total | | | 135 km | | 6.62 l | 20.39 km/l | 4.79 km/l | 30.62% |

TABLE 9

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| | | | | Before Installation | | | | |
| 10/3~6 | 45,879 | 46,047 | 168 km | | | | | |
| 10/6~11 | 46,047 | 46,168 | 121 km | | | | | |
| 10/11~14 | 46,168 | 46,341 | 173 km | 462 km | | | | |
| Total | | | 462 km | | 47.0 l | 9.83 km/l | | |

TABLE 10

| Date | Initial Meter Reading | Final Meter Reading | Driving Distance | Driving Distance Subtotal | Amount of Fuel Consumed | Driving Distance per Liter of Fuel | Extend Driving Distance per Liter of Fuel | Fuel Efficiency Improvement |
|---|---|---|---|---|---|---|---|---|
| | | | | After Installation | | | | |
| 10/14~16 | 46,341 | 46,535 | 194 km | | | | | |
| 10/16~19 | 46,535 | 46,692 | 157 km | | | | | |
| 10/19~21 | 46,692 | 46,859 | 167 km | 518 km | 41.5 l | | | |
| Total | | | 518 km | | 41.5 l | 12.48 km/l | 2.65 km/l | 26.95% |

TABLE 11

| | February 27 | | February 27 | |
|---|---|---|---|---|
| | Pre-Installation Base 1 | Pre-Installation Base 2 | Post-Installation 1 | Post-Installation 2 |
| Measuring Time (H.M.S) | 33 M. 40 S | 34 M. 17 S | 33 M. 48 S | 33 M. 53 S |
| Driving Distance (km) | 48.2 km | 48.2 km | 48.2 km | 48.2 km |
| Average Speed (km/H) | 85.9 km/H | 84.3 km/H | 85.5 km/H | 85.3 km/H |
| Fuel Consumption (l) | 3.84 l | 4.04 l | 3.49 l | 3.46 l |
| Distance per Liter (km/l) | 12.5 km/l | 11.9 km/l | 13.8 km/l | 13.9 km/l |
| Fuel Efficiency Improvement Rate (%) | | | 10.4% | 16.8% |

TABLE 11-continued

| | February 27 | | February 27 | |
|---|---|---|---|---|
| | Pre-Installation Base 1 | Pre-Installation Base 2 | Post-Installation 1 | Post-Installation 2 |
| Average Distance per Liter (km/l) | 12.2 km/l | | 13.8 km/l | |
| Average Fuel Efficiency Improvement Rate (%) | | | 13.1% | |

What is claimed is:

1. A fuel-reforming sheet, comprising:

a flexible stainless steel backing having a thickness of 0.2 mm; which is adapted to be place alongside of an inner wall of an air flow channel near an air filter installation port of an automobile engine, said flexible stainless steel backing being deformable to match the shape of said air flow channel and said flexible stainless steel backing having a first surface and a second surface;

a double sided adhesive sheet having front and back adhesive surfaces, the back adhesive surface being bonded to said first surface of the flexible stainless steel backing;

the front adhesive surface having a powdered mixture having a grain size in the range of 250–350 mesh, including a ceramic powder, a radioactive rare earth mineral powder and a magnetite binder, said powdered mixture being uniformly bonded to the front adhesive surface of said double-sided adhesive sheet; and said second surface adapted to be positioned in contact with the inner wall of said air flow channel.

* * * * *